(12) United States Patent
Towle

(10) Patent No.: US 7,376,081 B2
(45) Date of Patent: May 20, 2008

(54) ESTABLISHMENT OF QOS BY APPLICATIONS IN CELLULAR NETWORKS USING SERVICE BASED POLICY CONTROL MECHANISMS

(75) Inventor: Thomas T. Towle, Naperville, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 319 days.

(21) Appl. No.: 11/098,254

(22) Filed: Apr. 4, 2005

(65) Prior Publication Data

US 2006/0221828 A1 Oct. 5, 2006

(51) Int. Cl.
*H04L 12/26* (2006.01)
(52) U.S. Cl. ............... 370/230; 370/252; 370/331; 370/341; 370/392; 370/401; 455/435.1; 455/452.2; 709/229

(58) Field of Classification Search ............... 370/230, 370/252, 253, 331, 341, 392, 401; 455/435.1, 455/445, 452.2; 709/223, 229
See application file for complete search history.

(56) References Cited

U.S. PATENT DOCUMENTS

| 6,988,133 | B1* | 1/2006 | Zavalkovsky et al. ...... 709/223 |
| 7,027,818 | B2* | 4/2006 | Bos et al. ................ 455/452.2 |
| 7,120,156 | B2* | 10/2006 | Foti et al. ................ 370/401 |
| 2004/0073686 | A1* | 4/2004 | Hurta ..................... 709/229 |
| 2005/0238002 | A1* | 10/2005 | Rasanen .................. 370/352 |

* cited by examiner

*Primary Examiner*—Matthew Anderson
*Assistant Examiner*—Shaima Q. Aminzay

(57) ABSTRACT

An apparatus in one example may have: at least two endpoints operatively coupled to one another via an application function (AF) in a home network; a policy decision function operatively coupled to the AF; a policy decision enforcement (PDE) operatively coupled to the one of the endpoints; the PDF operatively coupled to the PDE; and a QoS managed bearer that is operatively connected to the endpoints.

17 Claims, 3 Drawing Sheets

ESTABLISHMENT OF QOS BY APPLICATIONS IN CELLULAR NETWORKS USING SERVICE BASED POLICY CONTROL MECHANISMS

TECHNICAL FIELD

The invention relates generally to telecommunication systems and more particularly to use of a service based policy control architecture to manage network initiated QoS bearers.

BACKGROUND

The IP Multi-Media Subsystem (IMS) is an IP multimedia and telephony core network. It is defined by 3GPP and 3GPP2standards and organizations based on IETF Internet protocols. IMS is access independent as it supports IP to IP session over wireline IP, 802.11, 802.15, CDMA, packet data along with GSM/EDGE/UMTS and other packet data applications. IMS is standardized reference architecture. IMS consists of session control, connection control and an applications services framework along with subscriber and services data. It enables new converged voice and data services, while allowing for the interoperability of these converged services between subscribers. IMS network infrastructure enables the convergence of data, speech, and mobile network technologies over an IP-based infrastructure.

Designed to fill the gap between existing traditional telecommunications technologies and the Internet, IMS provides the key functionalities required to enable new IP services via mobile networks taking into account the complexity of multimedia, constraints of the underlying network, managing mobility and the multitude of emerging applications. IMS permits and enhances real time, multimedia mobile services such as rich voice, video telephony, messaging, conferencing and push services by responding to the emerging trend to move toward a common, standardized subsystem. IMS services may include Push-to-Talk-over-Cellular, real time video sharing, interactive gaming, Instant Messaging Services, voice messaging, voice and video telephony, and video-conferencing.

Quality of service is commonly defined as the service users' degree of satisfaction during a given communications session. Consistently anticipating and meeting users' quality of service needs is what distinguishes successful communications service and product providers from their competition.

Network Services are considered end-to-end, this means from a Terminal Equipment (TE) to another TE. An End-to-End Service may have a certain Quality of Service (QoS), which is provided for the user of a network service. It is the user that decides whether he is satisfied with the provided QoS or not.

To realize a certain network QoS, a bearer service with clearly defined characteristics and functionality is to be set up from the source to the destination of a service. The bearer service includes all aspects to enable the provision of a contracted QoS. These aspects are among others the control signaling, user plane transport and QoS management functionality. A UMTS bearer service layered architecture may be used where each bearer service on a specific layer offers its individual services using services provided by the layers below.

Cellular telephony networks today are introducing higher bandwidth technologies in the access. Combined with higher access speeds, the core network is moving to using packet-based connectionless transports for services. With the advent of the IP Multimedia Subsystem (IMS), home based service control for multimedia applications is becoming a reality. Voice over IP (VoIP) and other QoS sensitive multimedia applications are being deployed and thus there is a new need for these applications to be able to manage their QoS needs.

The problem with the known operation is that all requests for QoS bearers by the mobile terminal must be authorized since the terminal is not a trusted entity. In this operation the network relies on the terminal to request a bearer that it has just negotiated with another endpoint rather than the network proposing to establish the bearer to the terminal.

Thus, a need exists for a procedure that removes the need to authorize a terminal request the network entity is not a trusted network entity.

SUMMARY

The invention in one implementation encompasses an apparatus. The apparatus comprises: at least two endpoints operatively coupled to one another via an application function (AF) in a home network; a policy decision function operatively coupled to the AF; a policy decision enforcement (PDE) operatively coupled to the one of the endpoints; the PDF operatively coupled to the PDE; and a QoS managed bearer that is operatively connected to the endpoints.

Another implementation of the invention encompasses a method. This implementation of the method may comprise: endpoints communicating in a network while negotiating the QoS for their end-to-end multimedia session; and the network relying on a terminal, operatively coupled to one of the endpoints, to request a bearer that the one endpoint has just negotiated with the other endpoint.

DESCRIPTION OF THE DRAWINGS

Features of exemplary implementations of the invention will become apparent from the description, the claims, and the accompanying drawings in which:

DETAILED DESCRIPTION

Figure 1:
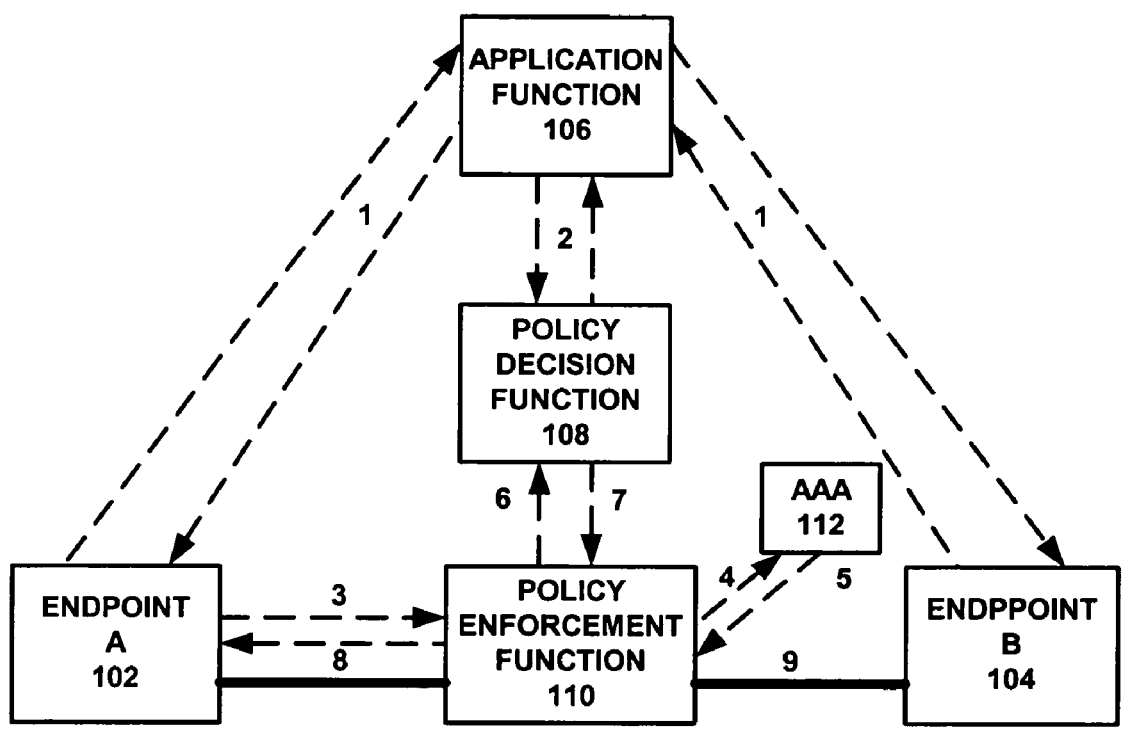
FIG. 1 is a representation of one known cellular system for QoS management.

The IP Multimedia Subsystem (IMS) is an enabler for many promising services based on the Internet Protocol (IP). Typically, the value-added IP services that will be offered through IMS are Quality of Service (QoS) sensitive. To support such services, the IMS architecture, defined in Third Generation Partnership Project (3GPP) release 5, introduces IMS-specific QoS mechanisms and service-based local policy control.

The IMS architecture adds functionality to the Universal Mobile Telecommunications System (UMTS) network, which is a true enabler for IP multimedia services, such as voice over IP, video and messaging services. This architecture relies on the concept of separating the IP data plane and the session control plane, based on the use of the Internet Engineering Task Force Session Initiation Protocol (IETF SIP), plus a minimum of 3GPP-specific SIP extensions accepted by the IETF. Support for IMS requires new network elements and interworking functions, such as the IMS-PSTN (Public Switched Telephone Network) interworking gateways. It also requires additional functionality in the User Equipment (UE).

The large scale introduction of IP multimedia services in the packet-switched domain puts additional demands on the QoS infrastructure provided by the UMTS bearer service. However, providing QoS to IMS services is not just a bearer level issue. Not only is there a need to involve the session layer in QoS control, but also to coordinate the bearer and session layer QoS.

Policy control enables an operator to control the user's access to network resources for IMS and non-IMS services, based on time-of-day, type of media, and so on. The PDF provides the capabilities needed to apply this service-based policy control in the UMTS access network.

In order to offer chargeable "carrier grade" services, it is important for an operator to correlate the QoS requested at the session layer (through session control signaling, such as SIP) with the actual QoS provided at the bearer level (PDP context activation). An important new feature of the IMS architecture is therefore the linkage between the session layer (SIP) and the UMTS bearer layer. For this purpose, the PDF is equipped with a policy control interface (Go), based on the Common Open Policy Service (COPS), which enables an operator to enforce policies on the PDP contexts in the GGSN.

The PDF is a policy decision point (in COPS terminology), while the GGSN hosts a policy enforcement function. The latter can police packet flows and restrict the set of IP destinations that can be reached through a PDP context according to packet filters. The binding between the media components specified at the session layer and the corresponding PDP contexts maintained at the GGSN, is ensured by using an authorization token. One authorization token is assigned per IMS (SIP) session; each media component (e.g. video or audio) in a SIP session is identified by a sequence number. The PDF has an interface with the Application Function (AF) on the service side and with the GGSN on the network side.

The AF controls applications that need to use IP bearer resources (e.g. UMTS packet-switched domain resources). It represents the application level intelligence for any service running over the IP bearer that needs service-based policy control.

The PDF makes policy decisions based on session and media related information obtained from the AF. At the heart of the PDF is a policy server, which stores the policy information; the granularity of this information is decided by the operator. For example, policy information can relate to all Access Point Names (APN) that are reachable via the UMTS network, or only to a given APN. Policy information is defined by the mobile operator.

The GGSN is the policy enforcement point for policy decisions made by the PDF. On receipt of connection requests (creation of PDP context), the GGSN sends requests and receives decisions from the PDF, the main functions of which are: authorization of session QoS resources; resource reservation; session release; and correlation of charging information.

In the initial interaction between the AF and the PDF, the AF provides the PDF with the media-related information (session requirements) to be used for the session. Based on the policy information contained in the policy server, the PDF authorizes (accepts or rejects) the use of QoS resources and provides the AF with the binding information to be used for PDP context creation.

When the GGSN receives a request for PDP context activation, it requests authorization from the PDF via the Go interface. The authorization token provided during the authorization of session QoS resources is used as the mechanism to enable the GGSN to contact the PDF that generated it. First, the PDF verifies that the PDP context activation request corresponds to an ongoing session. Second, it verifies that the requested bearer QoS corresponds to media resource information authorized by the AF. And third, it interacts with the GGSN to authorize the required QoS resources. The PDF provides the following information to the GGSN: QoS class to be used for the PDP context; data rate information authorized for the PDP context; and packet classifier.

The present method and apparatus may be utilized with other systems employing IMS as well as UMTS systems. For example, the present method and apparatus may be utilized with cdma2000 systems employing IMS.

The current standards for cellular systems address this need for QoS management by defining mechanisms by which the cellular terminal may request QoS enabled bearers from the Packet Data Subsystem or from the Radio Access Network. In either case since the mobile terminal is not a trusted entity, these requests for QoS must be authorized by the network using subscription based information and/or application provided information. New architectures have been established recently in support of what is called Service Based Local Policy (SBLP) control that allows an application to provide information to a Policy Decision Function (PDF). This QoS related information is used to authorize a subsequent request by the terminal for a QoS enabled bearer.

In such a system (as shown in FIG. 1), the endpoints 102, 104 of a communications session, communicate via an Application Function (AF) 106 while negotiating the QoS for their end-to-end multimedia session (step 1). Once the negotiation is complete the AF 106 communicates with a Policy Decision Function (PDF) 108 to provide the negotiated QoS to use as a limit on the QoS requested by the user for this session (step 2). When the terminal A 102 makes a request to the Policy Enforcement Function (PEF) 110 for a QoS managed bearer (step 3), the request is first authorized based on static subscription policy information using the AAA function 112 (or other similar subscription database and authorization function such as the HSS). This authorization might be performed in real time (steps 4 & 5), or it might be performed based on information obtained at the time the terminal at the endpoint A 102 is attached to the current PEF 110.

If the request is authorized based on the subscription it is then checked with the PDF 108 (step 6) to see if it falls within the current policy as determined by the PDF 108 based on dynamic AF inputs and perhaps modulated by local network policy. The local network policy considerations may be based on resource utilization needs or roaming agreements in the case of roaming configurations. The PDF 108 provides the policy decision to the PEF 110 (step 7). If the current policy is to allow the flow, the PEF 110 responds with a success to the terminal at the endpoint A 102 (step 8) and the bearer is then created (step 9).

The problem with this known operation is that all requests for QoS bearers by the mobile terminal must be authorized since the terminal is not a trusted entity. In this operation the network relies on the terminal to request a bearer that it has just negotiated with another endpoint rather than the network proposing to establish the bearer to the terminal.

If the network were to make a bearer establishment proposal to the terminal it would be based on information from a trusted entity and thus the authorization steps could be skipped. In addition, if the terminal were to have changed its mind about the use of the bearer, it could refuse the network-based proposal. If there is the possibility that the terminal might come back at a later time to request the bearer, the network could provide a token that the terminal could use that would be associated with the previously authorized QoS bearer.

Figure 2:
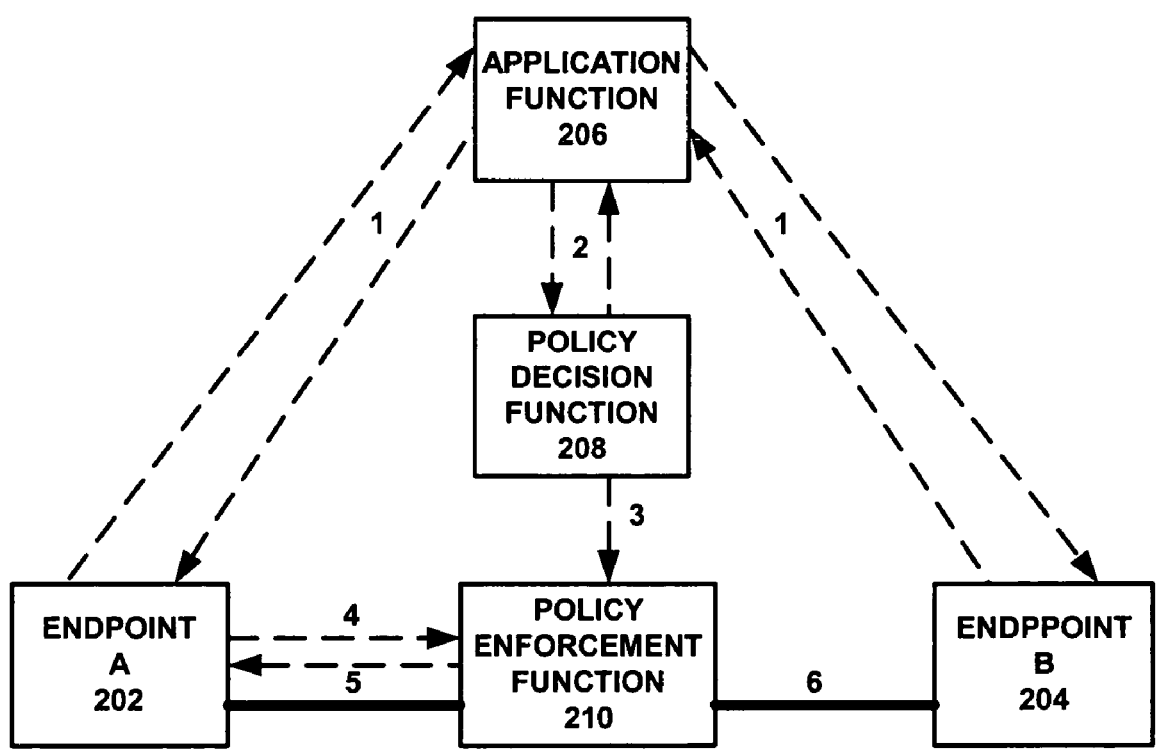
FIG. 2 is a representation of one implementation of an apparatus that comprises network support for use of a service-based policy control architecture to manage network initiated QoS bearers.

FIG. 2 shows the overall operation of one embodiment of the present method and apparatus for a configuration for network initiated QoS bearer establishment. In such a system, the endpoints A and B 202, 204 of a communications session, still communicate via an Application Function (AF) 206 in the home network while negotiating the QoS for their end-to-end multimedia session (step 1). Once the negotiation is complete the AF 206 communicates with the PDF 208 to provide the negotiated QoS to use as the QoS requested by the user for this session (step 2).

The PDF 208 makes a policy determination based on the information that it has received from the AF 206 and based on any local policy information that it might have. The local network policy considerations may be based on resource utilization needs or roaming agreements in the case of roaming configurations. At this point the PDF 208 may indicate to the PEF 210 the intent of the terminal to establish a QoS bearer and may provide the authorized QoS (step 3). The PEF 210 may initiate the establishment of the appropriate bearer either by communicating directly with the cellular terminal at the endpoint A 202 or via a Radio Access Network, depending on the particular technology being used for access (step 4).

When the terminal at the endpoint A 202 receives the bearer establishment request, it may either accept the proposal or decline to establish the bearer at this time (step 5). In the network-initiated request, the network may provide a token that may be used by the terminal in a subsequent request that would identify the pre-authorized bearer. Assuming that the terminal at the endpoint A 102 accepts the proposed bearer, the bearer is then established (step 6).

Figure 3:
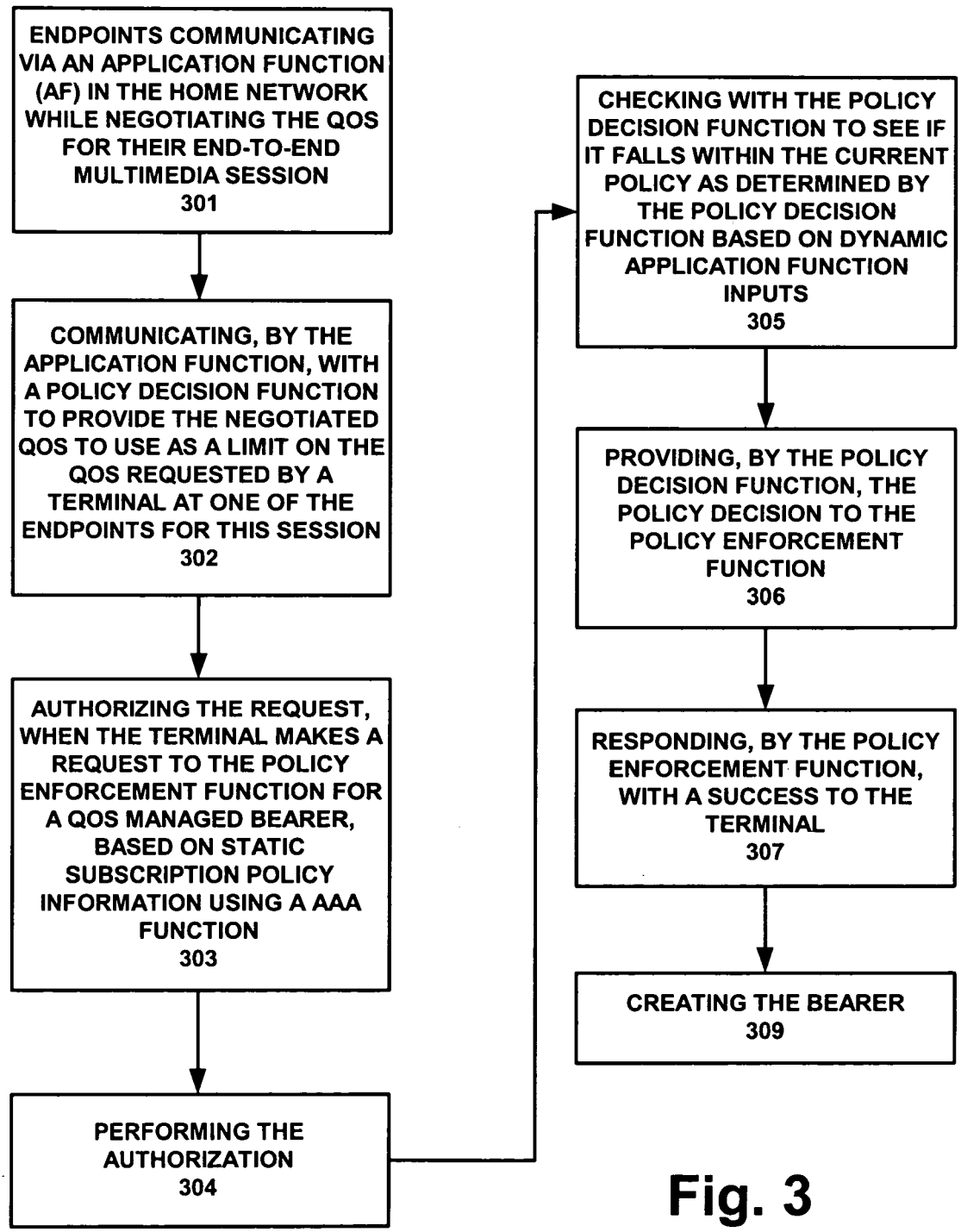
FIG. 3 is a representation of one exemplary method for implementation in the FIG. 2 embodiment.

FIG. 3 depicts a flow diagram of one exemplary embodiment of the present method. In this exemplary embodiment the method may have the following steps: endpoints communicating via an application function in the home network while negotiating the QoS for their end-to-end multimedia session (301); communicating, by the application function, with a policy decision function to provide the negotiated QoS to use as a limit on the QoS requested by a terminal at one of the endpoints for this session (302); authorizing the request, when the terminal makes a request to the policy enforcement function for a QoS managed bearer, based on static subscription policy information using a AAA function (303); performing the authorization (304); checking with the policy decision function to see if it falls within the current policy as determined by the policy decision function based on dynamic application function inputs (305); providing, by the policy decision function, the policy decision to the policy enforcement function (306); responding, by the policy enforcement function, with a success to the terminal (307); and creating a bearer (308).

Thus, embodiments of the present method and apparatus fulfill the need in the art for a procedure that removes the need to authorize a terminal request where the network entity is not a trusted network entity.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus comprising:
   at least two endpoints operatively coupled to one another via an application function (AF) in a home network;
   a policy decision function operatively coupled to the AF;
   a policy decision enforcement (PDE) operatively coupled to the one of the endpoints;
   the PDF operatively coupled to the PDE; and
   a QoS managed bearer that is operatively connected to the endpoints;
   wherein QoS requested at a session layer is correlated with actual QoS provided at a bearer layer using a linkage between the session layer and the bearer layer; and
   wherein the home network provides a token to be used by one of the at least two end points in a subsequent bearer request to identify pre-aUthorized bearer when the one of the at least two endpoints declines a requested bearer.

2. The apparatus according to claim 1, wherein the endpoints communicate via the application function (AF) in the home network while negotiating a quality of service (QoS) for an end-to-end multimedia session.

3. The apparatus according to claim 1, wherein the AF communicates with the PDF to provide a negotiated QoS to use as a requested QoS for the session.

4. The apparatus according to claim 1, wherein the PDF makes a policy determination based on at least one of information that the PDF has received from the AF and any local policy information that the PDF may have.

5. The apparatus according to claim 1, wherein the local network policy considerations are based on at least one of resource utilization needs and roaming agreements for roaming configurations.

6. The apparatus according to claim 1, wherein the PEF initiates establishment of a bearer by communicating directly with a cellular terminal at the endpoint.

7. The apparatus according to claim 1, wherein the PEF initiates establishment of a bearer by communicating via a radio access network.

8. A method, comprising:
   endpoints communicating in a network while negotiating the QoS for an end-to-end multimedia session; and
   the network relying on a terminal, operatively coupled to one of the endpoints, to request a bearer that the one endpoint has just negotiated with the other endpoint;
   wherein QoS requested at a session layer is correlated with actual QoS provided at a bearer layer using a linkage between the session layer and the bearer layer; and
   wherein the network provides a token to be used by the terminal in a subsequent bearer request to identify a pre-authorized bearer when the terminal declines a requested bearer.

9. The method according to claim 8, wherein the method further comprises:
the endpoints communicating via an application function in a home network while negotiating the QoS for an end-to-end multimedia session;
communicating, by the application function, with a policy decision function to provide the negotiated QoS to use as a limit on the QoS requested by a terminal at one of the endpoints for this session;
authorizing the request, when the terminal makes a request to the policy enforcement function for a QoS managed bearer, based on static subscription policy information;
performing the authorization;
checking with the policy decision function to see if it falls within the current policy as determined by the policy decision function based on dynamic application function inputs;
providing, by the policy decision function, the policy decision to the policy enforcement function;
responding, by the policy enforcement function, with a success to the terminal; and
creating a bearer for the end-to-end multimedia session.

10. The method according to claim 9, wherein in the step of checking with the policy decision function to see if it falls within the current policy as determined by the policy decision function, the policy decision function is based on dynamic application function inputs and modulated by local network policy.

11. The method according to claim 9, wherein in the step of authorizing the request, when the terminal makes a request to the policy enforcement function for a QoS managed bearer, based on static subscription policy information, a subscription database and authorization function is used.

12. The method according to claim 9 wherein in the step of performing the authorization, the authorization is performed in one of real time and based on information obtained at a time the terminal is attached to the policy enforcement function.

13. A method, comprising:
endpoints communicating via an application function in a home network while negotiating the QoS for an end-to-end multimedia session;
communicating, by the application function, with a policy decision function to provide the negotiated QoS to use as a limit on the QoS requested by a terminal at one of the endpoints for this session;
authorizing the request, when the terminal makes a request to the policy enforcement function for a QoS managed bearer, based on static subscription policy information;
performing the authorization;
checking with the policy decision function to see if it falls within the current policy as determined by the policy decision function based on dynamic application function inputs;
providing, by the policy decision function, the policy decision to the policy enforcement function;
responding, by the policy enforcement function, with a success to the terminal; and
creating a bearer for the end-to-end multimedia session;
wherein QoS requested at a session layer is correlated with actual QoS provided at a bearer layer using a linkage between the session layer and the bearer layer; and
wherein the home network provides a token to be used by the terminal at the one of the endpoints in a subsequent bearer request to identify a pre-authorized bearer when the terminal at the one of the endpoints declines a requested bearer.

14. The method according to claim 13, wherein in the step of checking with the policy decision function to see if it falls within the current policy as determined by the policy decision function, the policy decision function is based on dynamic application function inputs and modulated by local network policy.

15. The method according to claim 13, wherein the local network policy considerations are based on at least one of resource utilization needs and roaming agreements for roaming configurations.

16. The method according to claim 13 wherein in the step of authorizing the request, when the terminal makes a request to the policy enforcement function for a QoS managed bearer, based on static subscription policy information, a subscription database and authorization function is used.

17. The method according to claim 13, wherein in the step of performing the authorization, the authorization is performed in one of real time and based on information obtained at a time the terminal is attached to the policy enforcement function.

* * * * *